United States Patent
Ito et al.

(10) Patent No.: US 6,779,973 B2
(45) Date of Patent: Aug. 24, 2004

(54) GAS TURBINE

(75) Inventors: Eisaku Ito, Hyogo (JP); Kazuo Uematsu, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 286 days.

(21) Appl. No.: 10/002,089

(22) Filed: Dec. 6, 2001

(65) Prior Publication Data

US 2002/0098082 A1 Jul. 25, 2002

(30) Foreign Application Priority Data

Jan. 25, 2001 (JP) .............................. 2001-017662

(51) Int. Cl.$^7$ ................................................ F01D 9/00
(52) U.S. Cl. ............... 415/191; 416/223 A; 416/DIG. 2
(58) Field of Search .................... 415/191, 193, 415/181, 199.5, 207, 211.2, 220, 224.5, 199.4, 208.1, 208.2, 209.1; 416/223 A, 243, DIG. 2, DIG. 5

(56) References Cited

U.S. PATENT DOCUMENTS 5,203,676 A  4/1993 Ferleger et al.
6,036,438 A  3/2000 Imai

FOREIGN PATENT DOCUMENTS

| EP | 0 953 728 | 11/1999 |
| GB | 868100 | 5/1961 |
| GB | 1080015 | 8/1967 |
| JP | 3-275946 | 12/1991 |
| JP | 11-241601 | 9/1999 |
| JP | 2000-179303 | 6/2000 |

OTHER PUBLICATIONS

Patent Abstracts of Japan, JP 8–260905, Oct. 8, 1996.

*Primary Examiner*—Edward K. Look
*Assistant Examiner*—Kimya N. McCoy
(74) *Attorney, Agent, or Firm*—Oblon, Spivak, McClelland, Maier & Neustadt, P.C.

(57) ABSTRACT

The pressure ratio $\Delta P4S$ of a final stage moving blade is reduced. As a result, the Mach number in the final stage moving blade can be suppressed, and in the gas turbine operating at a pressure ratio of 20 or more, therefore, decline of turbine efficiency due to shock wave loss can be prevented securely.

11 Claims, 9 Drawing Sheets

AVERAGE EXIT MACH NUMBER OF TURBINE
FINAL STAGE MOVING BLADE (M2)

GAS TURBINE

FIELD OF THE INVENTION

The present invention relates to a gas turbine operating at a pressure ratio of 20 or more. More particularly, this invention relates to a gas turbine capable of securely preventing drop of turbine efficiency due to shock wave loss.

BACKGROUND OF THE INVENTION

A conventional gas turbine will be explained by referring to FIG. 7. Generally, a gas turbine comprises plural stages (four stages in this example) of stationary blades 1C to 4C arranged in a circle around a casing (blade ring or chamber) 1, and plural stages (four stages in this example) of moving blades 1S to 4S arranged in a circle around a rotor (hub or base) 2. FIG. 7 shows only the stationary blade 1C and moving blade 1S of the first stage, and the stationary blade 4C and moving blade 4S of the final stage, that is, the fourth stage (the area indicated by solid line ellipse).

Recently, in the mainstream of gas turbines, for example, the pressure ratio (expansion ratio) of all stages is large, that is, 20 or more ($\pi \geq 20$), and the turbine inlet gas temperature is high, 1450° C. or more (TIT$\geq$1450° C.). In such gas turbine, therefore, the pressure ratio of the final stage is 2.0 or more ($\pi \geq 2$).

When the pressure ratio of the final stage is more than 2.0, as shown in FIG. 8, the average exit Mach number (M2) of the final stage moving blade 4S is in a range of 0.95 to 1.2 ($0.95 \leq M2 \leq 1.2$). Accordingly, by shock wave loss, the total pressure loss coefficient of the final stage moving blades 4S is in a suddenly increasing region. It means decline of turbine efficiency. In FIG. 8, the range of Mach number of M2<0.95 in the arrow A direction shows the range of conventional gas turbine for power generation of low load or gas turbine for aircraft. The range of Mach number M2>1.2 in the arrow B direction shows the range of steam turbine.

Mechanism of decline of turbine efficiency due to shock wave is explained by referring to FIG. 9 and FIGS. 10(A) and (B). The final stage moving blade 4S is composed of a front edge 3, a rear edge 4, and a belly 5 and a back 6 linking the front edge 3 and rear edge 4. In FIG. 9, the blank arrow indicates the rotating direction of the final stage moving blade 4S.

When the pressure ratio of all stages is large, the pressure ratio of the final stage is also large, and the Mach number in the final stage moving blade 4S is large. In particular, as shown in the blade surface Mach number distribution in FIG. 10(B), the Mach number is large at the back 6 side of the final stage moving blade 4S. When the Mach number exceeds 1, as shown in FIG. 9, a shock wave 7 is generated. By generation of this shock wave 7, a boundary layer 8 (shaded area in FIG. 9 and FIG. 10(A)) is formed in a range from behind the shock wave 7 to the rear edge 4, at the back 6 side of the final stage moving blade 4S. This boundary layer 8 grows as the Mach number increases. By the growth of the boundary layer 8, the pressure loss increases, and the turbine efficiency is lowered. That is, by the boundary layer 8, the flow of the combustion gas G is disturbed, and the turbine efficiency is lowered.

The decline of turbine efficiency due to shock wave appears more prominently in the area of the tip side (for example, broken line oval area in FIG. 7), in particular, in the final stage moving blade 4S.

SUMMARY OF THE INVENTION

It is an object of this invention to provide a gas turbine capable of preventing securely decline of turbine efficiency due to shock wave loss in a gas turbine operating at a pressure ratio of 20 or more.

The gas turbine according to one aspect of this invention operates at a pressure ratio of 20 or more. Moreover, the gas turbine comprises a final stage of blades that includes a stationary blade and a moving blade. The moving blade is constructed such that the pressure difference at the downstream and upstream sides of said moving blade is 0.15 MPa or less.

The gas turbine according to another aspect of this invention operates at a pressure ratio of 20 or more. Moreover, the gas turbine comprises a final stage of blades that includes a stationary blade and a moving blade. In this gas turbine, a gauging ratio of said stationary blade is 0.9 or less. The gauging ratio is a ratio of a tip side gauging and a hub side gauging.

The gas turbine according to still another aspect of this invention operates at a pressure ratio of 20 or more. Moreover, the gas turbine comprises a final stage of blades that includes a stationary blade and a moving blade. In this gas turbine, an exit angle ratio of said stationary blade is 0.85 or more. The exit angle ratio is a ratio of a tip side exit angle and a hub side exit angle.

The gas turbine according to still another aspect of this invention operates at a pressure ratio of 20 or more. In this gas turbine, a duct wall in a portion of a specified distance from an end opposing said gas turbine, of a duct forming a diffuser passage communicating with a final exit side of said gas turbine is drawn parallel to or inside of a shaft of the gas turbine.

Other objects and features of this invention will become apparent from the following description with reference to the accompanying drawings.

DETAILED DESCRIPTIONS

Embodiments of the gas turbine according to the present invention will be explained in detail while referring to FIG. 1 to FIG. 6. It must be noted that the gas turbine is not limited to these illustrated embodiments alone.

Figure 1:
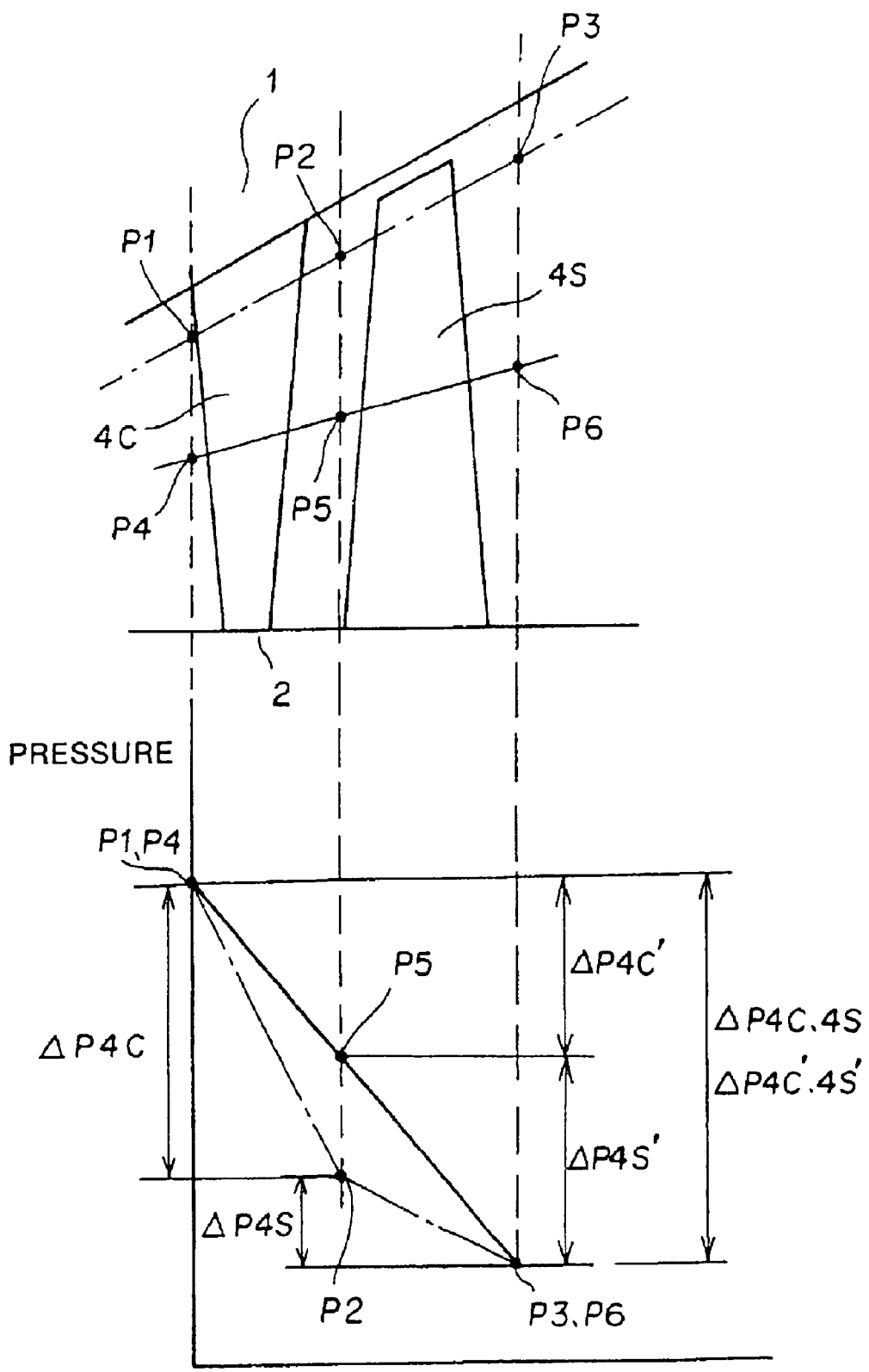
FIG. 1 is an explanatory diagram of pressure measurement showing a first to sixth embodiments of gas turbine of the invention.

FIG. 1 shows a first embodiment of gas turbine of the invention. In the drawings, same reference numerals as in FIG. 7 to FIG. 10 indicate corresponding parts.

The upper half of FIG. 1 is for explaining how a pressure in the final stage of blades ("final stage") is measured. In the diagram, point P1 denotes the pressure measuring point at the tip inlet side of the final stage stationary blade 4C. Point P2 represents the pressure measuring points at the tip exit side of the final stage stationary blade 4C and the tip inlet side of the final stage moving blade 4S. Point P3 shows the pressure measuring point at the tip exit side of the final stage moving blade 4S. Point P4 indicates the pressure measuring point at the mean inlet side of the final stage stationary blade 4C. Point P5 represents the pressure measuring points at the mean exit side of the final stage stationary blade 4C and the mean inlet side of the final stage moving blade 4S. Point P6 shows the pressure measuring point at the mean exit side of the final stage moving blade 4S.

The lower half of FIG. 1 explains how a pressure ratio is compiled on the basis of the pressure measurement in the upper half of FIG. 1. In the diagram, $\Delta P4S$ shows the pressure ratio at the tip side of the final stage moving blade 4S. $\Delta P4S'$ shows the pressure ratio (average pressure ratio) at the mean side of the final stage moving blade 4S. $\Delta P4C$ shows the pressure ratio at the tip side of the final stage stationary blade 4C. $\Delta P4C'$ shows the pressure ratio (average pressure ratio) at the mean side of the final stage stationary blade 4C. $\Delta P4C, 4S$ refers to the pressure ratio at the tip side of the final stage. $\Delta P4C', 4S'$ indicates the pressure ratio (average pressure ratio) at the mean side of the final stage.

The gas turbine in the first embodiment operates at a pressure ratio of 20 or more ($\pi \geq 20$), in which the structure of downstream side including the final stage stationary blade 4C is designed so that the pressure difference at the tip side of the final stage moving blade 4S may be 0.15 MPa or less ($\Delta P \leq 0.15$ MPa).

In the gas turbine of the first embodiment, the pressure difference $\Delta P$ at the tip side of the final stage moving blade 4S, that is, the pressure ratio $\Delta P4S$ at the tip side of the final stage moving blade 4S as shown in FIG. 1(B) can be set smaller than the average pressure ratio $\Delta P4S'$. As a result, the Mach number in the final stage moving blade 4S can be suppressed smaller, and therefore in the gas turbine operating at a pressure ratio of 20 or more, decline of turbine efficiency due to shock wave loss can be prevented securely.

Figure 2:
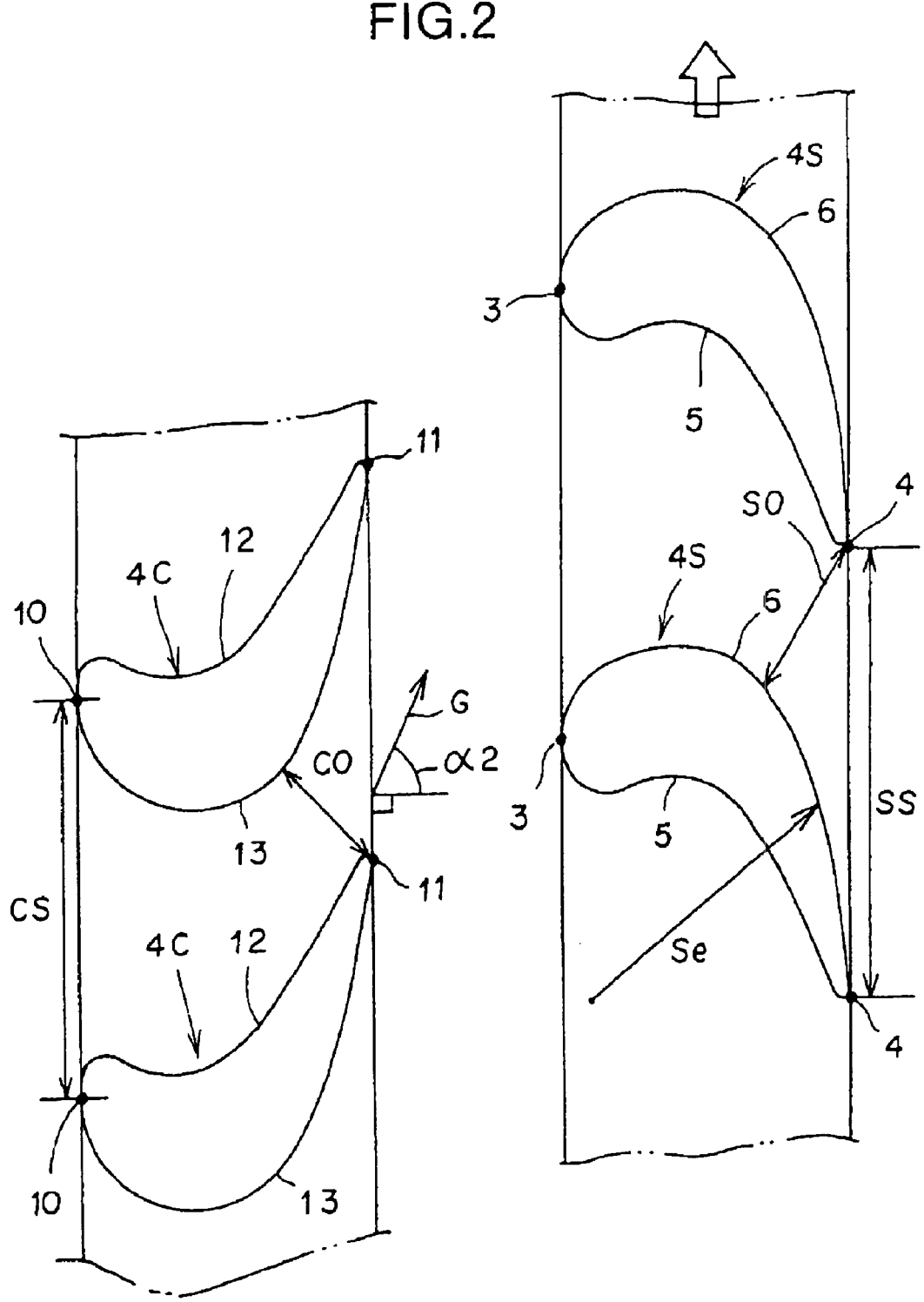
FIG. 2 is an explanatory diagram of a section of the final stage.
Figure 3:
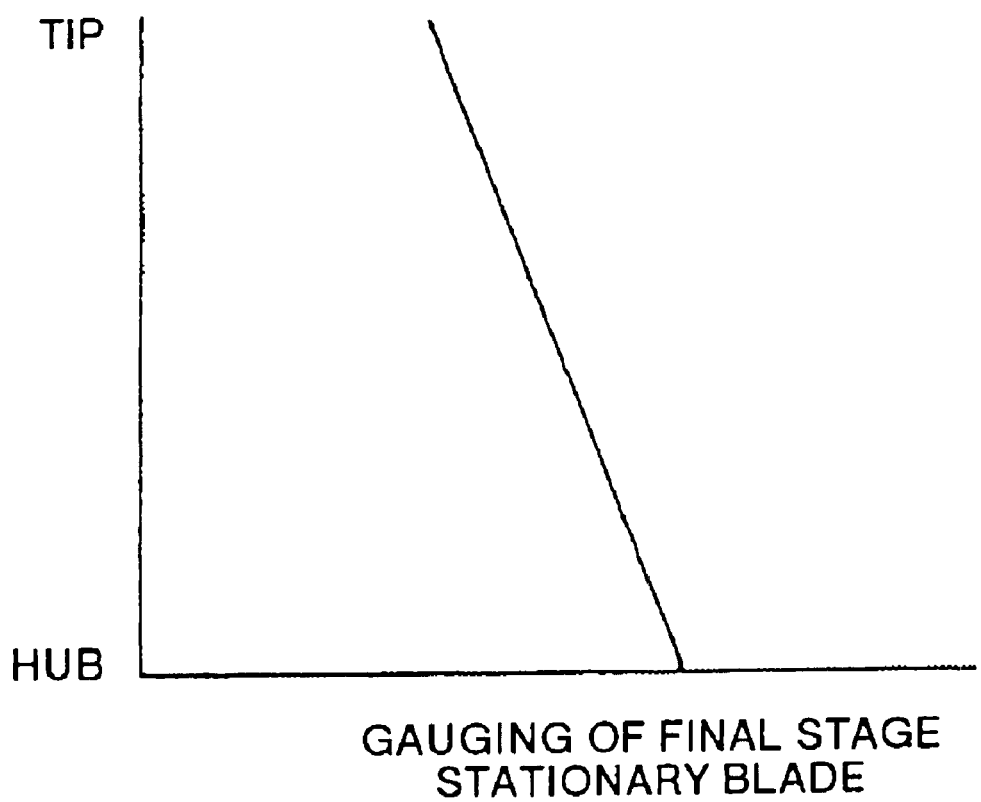
FIG. 3 is an explanatory diagram of gauging of final stage moving blade.

FIG. 2 and FIG. 3 show a second embodiment of the gas turbine of the invention. In the drawing, same reference numerals as in FIG. 1 and FIG. 7 to FIG. 10 refer to corresponding parts.

FIG. 2 is an explanatory diagram of the section of the final stage. The final stage stationary blade 4C is composed of a front edge 10, a rear edge 11, and a belly 12 and a back 13 linking the front edge 10 and rear edge 11. FIG. 3 is an explanatory diagram showing the gauging ratio of the final state stationary blade.

In the gas turbine of the second embodiment, the gauging ratio of the final stage stationary blade 4C, that is, tip side gauging/hub side gauging is 0.9 or less (tip side gauging/hub side gauging $\leq 0.9$). The gauging of the final stage stationary blade 4C increases from the tip side to the hub side as shown in FIG. 3.

The gauging is determined by (throat length CO/pitch CS). The throat length CO is the shortest distance from the rear edge 11 to the back 13 of the adjacent final stage stationary blades 4C. The pitch CS is the distance between the front edges 10 or between the rear edges 11 of the adjacent final stage stationary blades 4C.

In the gas turbine of the second embodiment, as shown in FIG. 3, the gauging at the tip side of the final stage stationary blade 4C is reduced to be small. As a result, as shown in the lower half of FIG. 1, the pressure ratio $\Delta P4C$ at the tip side of the final stage stationary blade 4C is responsible for the majority of the pressure ratio $\Delta P4C, 4S$ of the final stage, and the pressure ratio $\Delta P4S$ at the tip side of the final stage moving blade 4S can be decreased to be smaller than the average pressure ratio $\Delta P4S'$. As a result, the Mach number in the final stage moving blade 4S can be suppressed small, and decline of turbine efficiency due to shock wave loss can be prevented securely.

Further, as shown in FIG. 3, by increasing the gauging at the hub side of the final stage stationary blade 4C, the degree of reaction (pressure ratio of moving blade/pressure ratio of stage) at the hub side of the final stage (the area enclosed by single dot chain line in FIG. 7) can be increased. Therefore, if the degree of reaction at the tip side of the final stage (pressure ratio of moving blade $\Delta P4S$/pressure ratio of stage $\Delta P4C, 4S$) becomes smaller by reducing the gauging at the tip side of the final stage, there is no particular problem in designing of the turbine.

Moreover, in the gas turbine of the second embodiment, by using the gauging ratio of the final stage stationary blade 4C shown in FIG. 3 as the parameter, the turbine design is simplified.

In the gas turbine of a third embodiment, as shown in FIG. 2, the exit angle $\alpha 2$ ratio (tip side exit angle/hub side exit angle) of the final stage stationary blade 4C is 0.85 or more (tip side exit angle/hub side exit angle $\geq 0.85$)

In the gas turbine of the third embodiment, same as in the gas turbine of the second embodiment, the exit angle $\alpha 2$ at the tip side of the final stage stationary blade 4C is reduced. As a result, as shown in upper half of FIG. 1, the tip side pressure ratio $\Delta P4C$ of the final stage stationary blade 4C is responsible for the majority of the pressure ratio $\Delta P4C, 4S$ of the final stage, and the pressure ratio $\Delta P4S$ at the tip side of the final stage moving blade 4S can be decreased so as to be smaller than the average pressure ratio $\Delta P4S'$. As a result, the Mach number in the final stage moving blade 4S can be suppressed small, and decline of turbine efficiency due to shock wave loss can be prevented securely.

Further, by increasing the exit angle $\alpha 2$ at the hub side of the final stage stationary blade 4C, the degree of reaction at the hub side of the final stage (pressure ratio of moving blade/pressure ratio of stage) can be increased. Therefore, if the degree of reaction at the tip side of the final stage (pressure ratio $\Delta P4S$ of moving blade/pressure ratio $\Delta P4C, 4S$ of stage) becomes smaller by reducing the exit angle $\alpha 2$ at the tip side of the final stage, there is no particular problem in designing of the turbine.

According to the gas turbine of the third embodiment, same as in the gas turbine of the second embodiment, by using the exit angle $\alpha 2$ ratio of the final stage stationary blade 4C as the parameter, the turbine design is simplified.

In the gas turbine of a forth embodiment, the boss ratio at the exit side of the final stage moving blade 4S (hub radius R1/tip radius R2) is 0.4 or more to 0.65 or less ($0.4 \leq$ hub radius/tip radius $\leq 0.65$). The hub radius R1 and tip radius R2 are as defined in FIG. 7.

In the gas turbine of the forth embodiment, the boss ratio at the exit side of the final stage moving blade 4S is defined in a range of 0.4 to 0.65. As a result, the gauging ratio of the final stage stationary blade 4C of the gas turbine in the second embodiment and the exit angle $\alpha 2$ ratio of the final stage stationary blade 4C of the gas turbine in the third embodiment can be determined appropriately.

In the gas turbine of a fifth embodiment, the average degree of reaction of the final stage is 0.3 or more to 0.6 or less ($0.3 \leq$ degree of reaction $\leq 0.6$).

As a result, in the gas turbine of the fifth embodiment, by defining the average degree of reaction of the final stage in a range of 0.3 to 0.6, the average degree of reaction of the final stage can be maintained sufficiently, and there is no particular problem in turbine design.

In the gas turbine of a sixth embodiment, as shown in FIG. 2, the curvature from the back side 6 throat SO to the rear edge 4 of the final stage moving blade 4S (radius of curvature Se of the back side 6 from the pitch SS/throat SO to the rear edge 4 of the final stage moving blade 4S) is 0 or more to 0.15 or less (0≦radius of curvature Se of the back side 6 from the pitch SS/throat SO to the rear edge 4 of the final stage moving blade 4S≦0.15).

In the gas turbine of the sixth embodiment, the curvature from the back side 6 throat SO to the rear edge 6 of the final stage moving blade 4S is defined in a range of 0 to 0.15. As a result, the gauging ratio of the final stage stationary blade 4C of the gas turbine in the second embodiment and the exit angle a2 ratio of the final stage stationary blade 4C of the gas turbine in the third embodiment can be determined appropriately.

Figure 4:
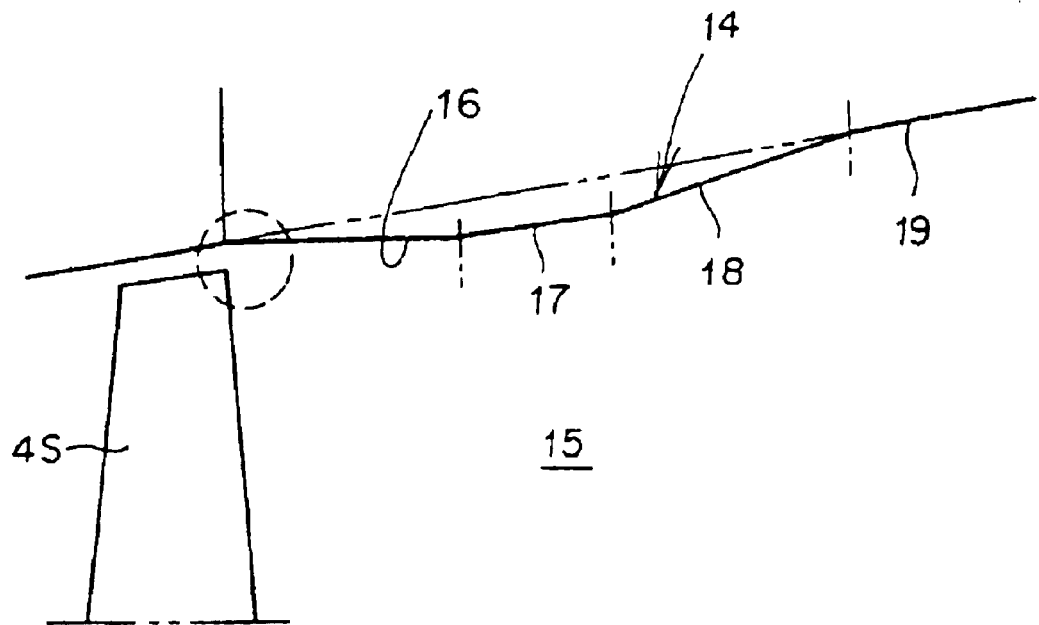
FIG. 4 is a partial sectional view showing a seventh embodiment of gas turbine of the invention.
Figure 5:
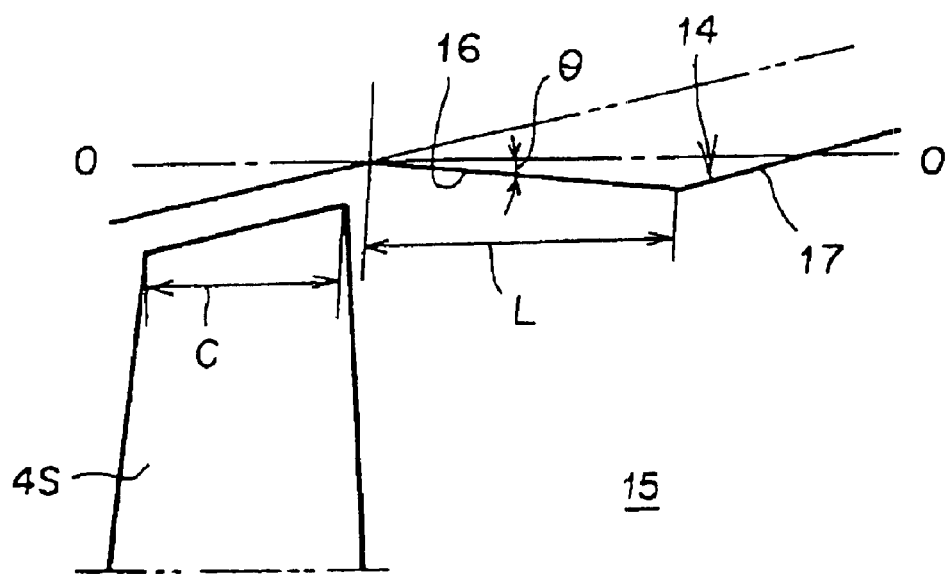
FIG. 5 is a partial magnified sectional view of the same.
Figure 6:
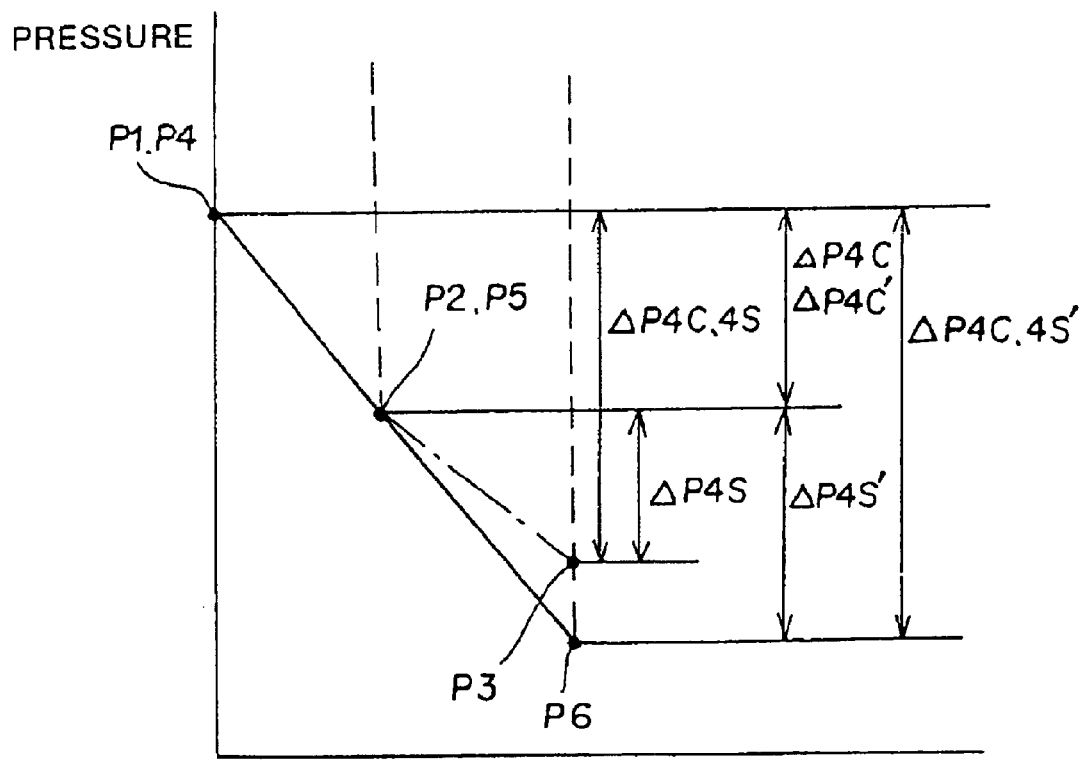
FIG. 6 is an explanatory diagram of pressure ratio of the same.
Figure 7:
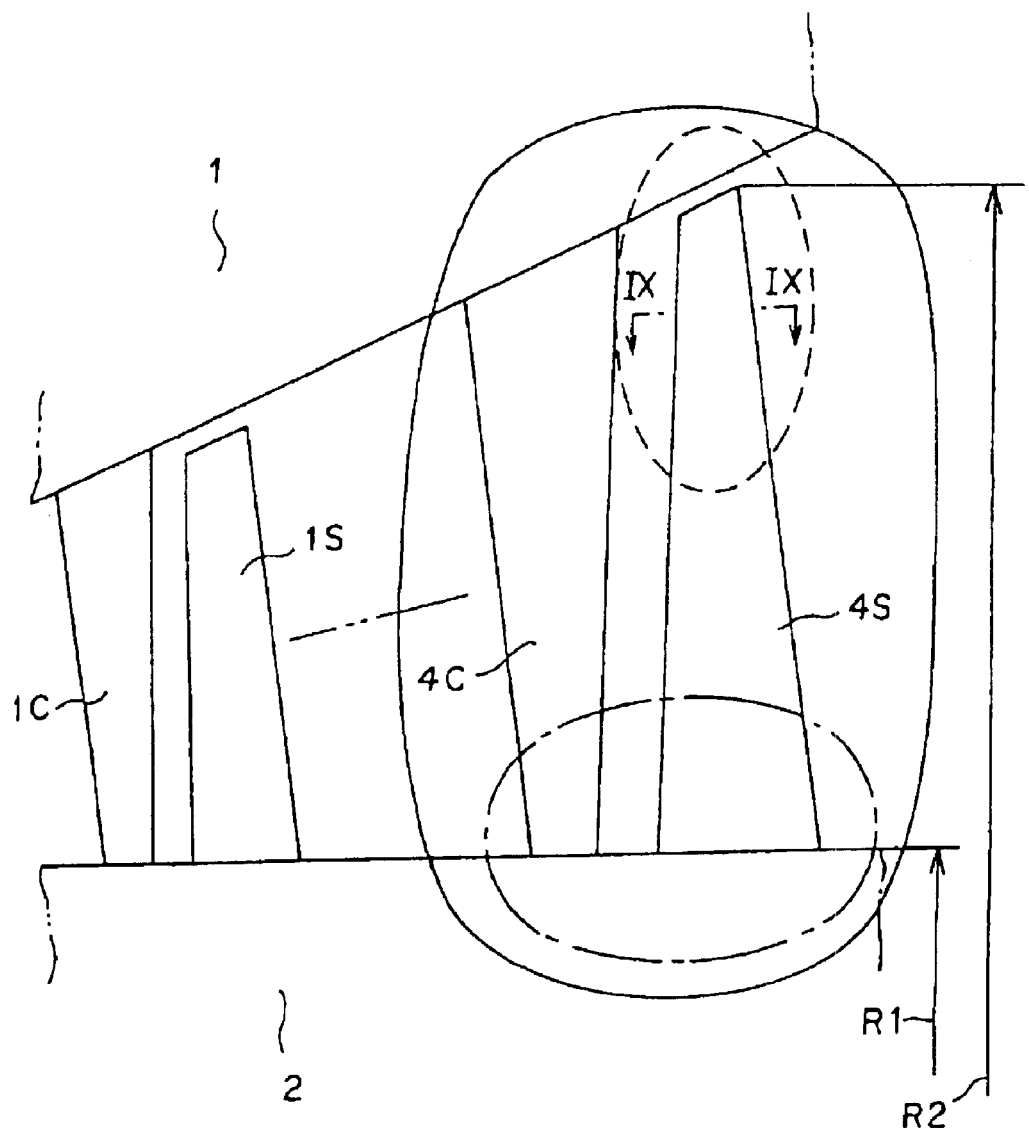
FIG. 7 is an explanatory diagram of a general gas turbine.
Figure 8:
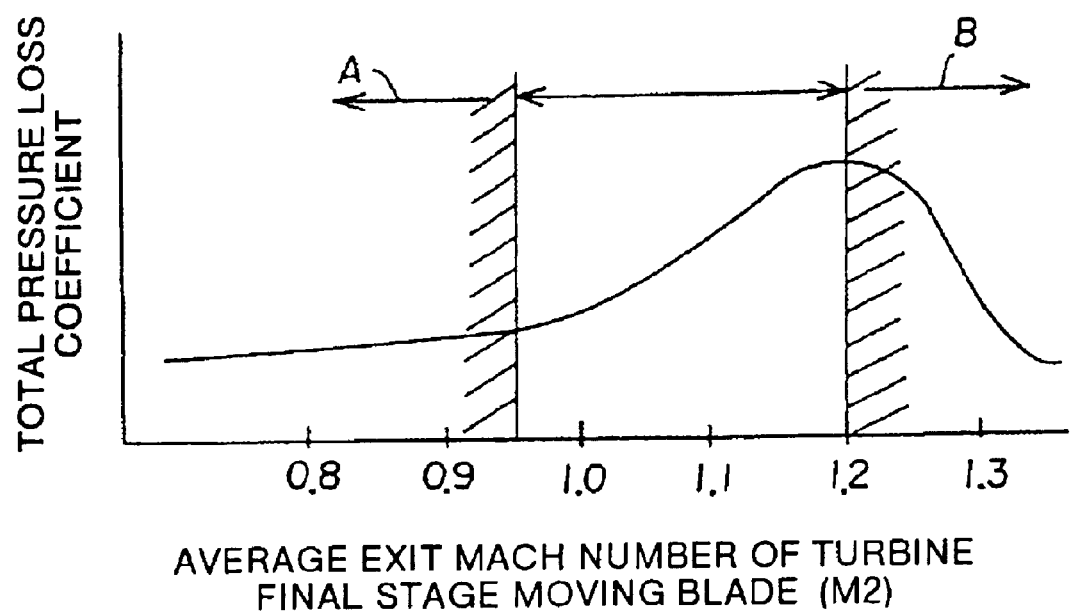
FIG. 8 is a graph showing the correlation of average exist Mach number and total pressure loss coefficient of final stage moving blade of turbine.
Figure 9:
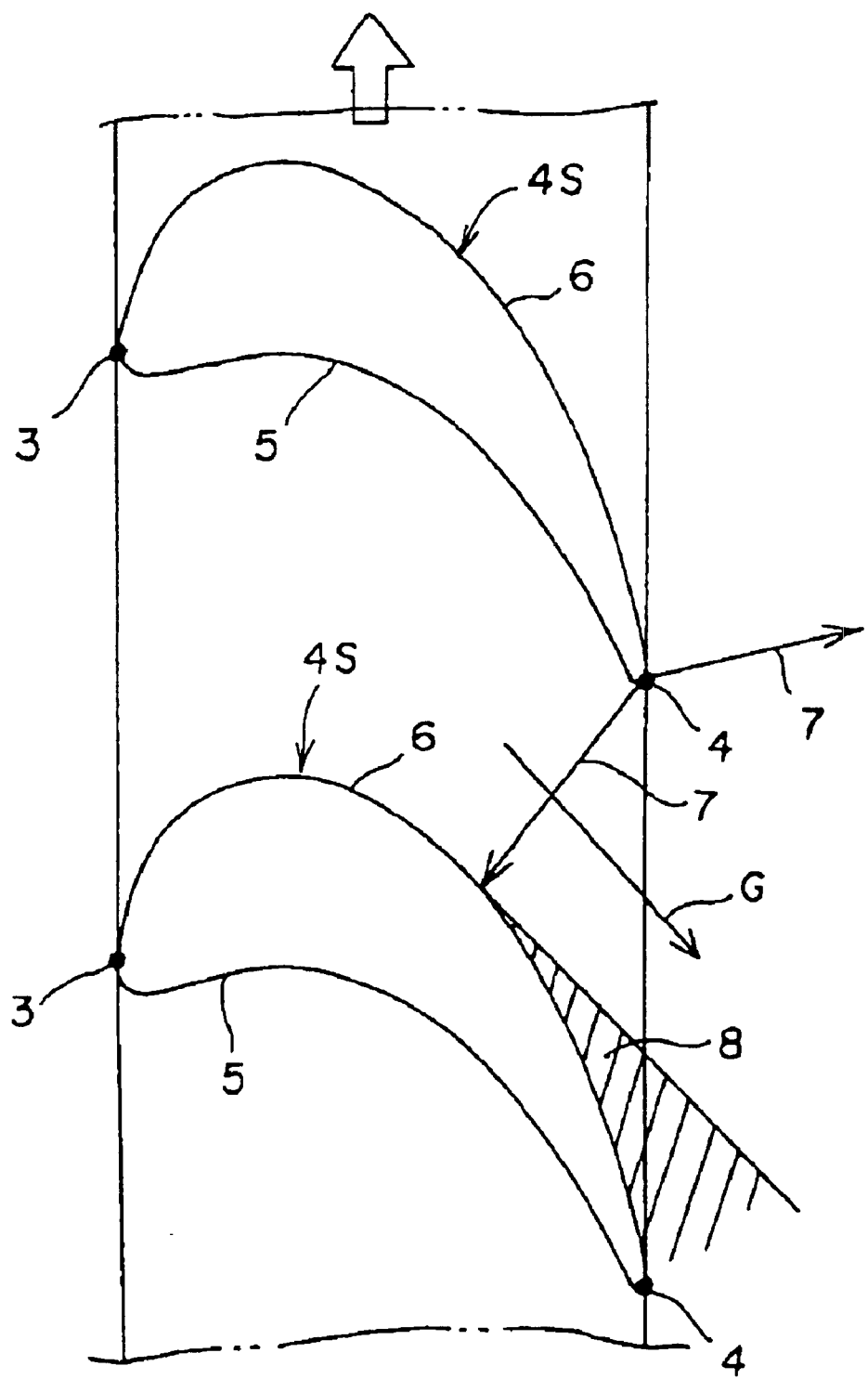
FIG. 9 is a sectional view along line IX—IX in FIG. 7.
Figure 10A:
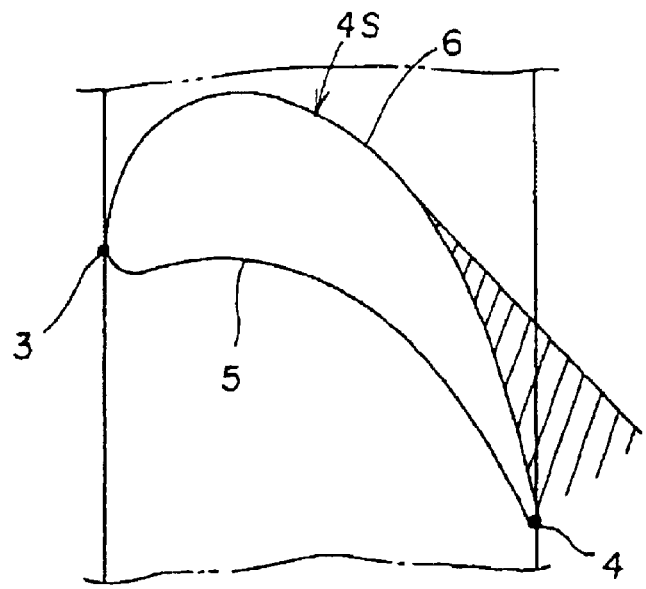
FIG. 10A is an explanatory diagram of section at tip side of final stage moving blade.
Figure 10B:
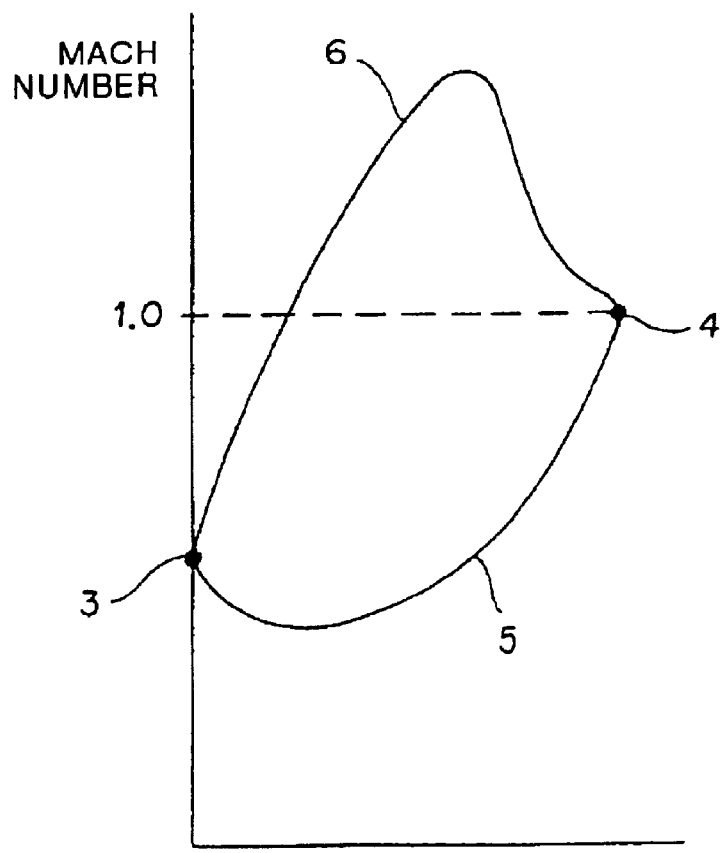
FIG. 10B is an explanatory diagram of Mach number distribution on blade surface at tip side of final stage moving blade.

FIG. 4 to FIG. 6 show a seventh embodiment of the gas turbine of the invention. In the drawings, same parts as in FIGS. 1 to 3 and FIGS. 7 to 10 are identified with same reference numerals.

In the drawings, reference numeral 14 is a duct forming a diffuser passage 15 communicating with the final exit side of the gas turbine. This duct 14 is connected to, for example, an exhaust boiler (not shown).

Of the duct 14, the duct wall 16 in the portion of a specified distance L from the end opposing the gas turbine is drawn parallel to or inside of the shaft O—O of the gas turbine (0°≦θ≦5°).

The distance L of the duct wall 16 is 0.5 times or more to 3 times or less of the blade chord length C at the tip side of the final stage moving blade 4S (0.5C≦L≦3C) Further, downstream side duct walls 17, 18, 19 of the duct wall 16 are folded in two steps so as to be inclined same as in the conventional duct (indicated by double dot chain line in FIG. 4 and FIG. 5).

In the gas turbine of the seventh embodiment, the pressure is larger in the duct wall 16 (indicated by broken line circle in FIG. 4) drawn parallel or inside, out of the diffuser passage 15. Accordingly, the pressure P3 at the tip exit side of the final stage blade moving blade 4S opposite to the duct wall 16 is increased, and the pressure ratio ΔP4S at the tip side of the final stage moving blade 4S is smaller. Hence, the Mach number can be suppressed small in the final stage moving blade, and decline of turbine efficiency due to shock wave loss can be securely prevented.

Since the pressure ratio at the hub side of the final stage moving blade 4S is unchanged, the degree of reaction at the hub side of the final stage (pressure ratio of moving blade/pressure ratio of stage) remains the same. Therefore, if the degree of reaction at the tip side of the final stage (pressure ratio ΔP4S of moving blade/pressure ratio ΔP4C, 4S of stage) becomes smaller by reducing the pressure ratio ΔP4S at the tip side of the final stage moving blade 4S, there is no particular problem in designing of the turbine.

As explained above, in the gas turbine according to one aspect of this invention, by decreasing the pressure difference of the final stage moving blade, that is, the pressure ratio of the final stage moving blade, the Mach number in the final stage moving blade is suppressed small. As a result, in the gas turbine operating at a pressure ratio of 20 or more, decline of turbine efficiency due to shock wave loss can be prevented securely.

In the gas turbine of another aspect of this invention, the gauging ratio of the final stage stationary blade (tip side gauging/hub side gauging) is 0.9 or less, and the gauging at the tip side of the final stage stationary blade can be reduced to a small value. Accordingly, the tip side of the final stage stationary blade is responsible for the majority of the pressure ratio of the final stage, and the pressure ratio at the tip side of the final stage moving blade can be decreased. As a result, the Mach number in the final stage moving blade can be suppressed small, and decline of turbine efficiency due to shock wave loss can be prevented securely. Further, by increasing the gauging at the hub side of the final stage stationary blade, the degree of reaction at the hub side of the final stage (pressure ratio of moving blade/pressure ratio of stage) can be increased. Therefore, if the degree of reaction at the tip side of the final stage becomes smaller by reducing the gauging at the tip side of the final stage, there is no particular problem in designing of the turbine. Moreover, by using the gauging ratio of the final stage stationary blade as the parameter, the turbine design is simplified.

In the gas turbine of still another aspect of this invention, the exit angle ratio of the final stage stationary blade (tip side exit angle/hub side exit angle) is 0.85 or more, and same as in the invention, the exit angle at the tip side of the final stage stationary blade can be reduced. Accordingly, the tip side of the final stage stationary blade is responsible for the majority of the pressure ratio of the final stage, and the pressure ratio at the tip side of the final stage moving blade can be decreased. As a result, the Mach number in the final stage moving blade can be suppressed small, and decline of turbine efficiency due to shock wave loss can be prevented securely. Further, by increasing the exit angle at the hub side of the final stage stationary blade, the degree of reaction at the hub side of the final stage (pressure ratio of moving blade/pressure ratio of stage) can be increased. Therefore, if the degree of reaction at the tip side of the final stage becomes smaller by reducing the exit angle at the tip side of the final stage, there is no particular problem in designing of the turbine. Moreover, by using the exit angle ratio of the final stage stationary blade as the parameter, the turbine design is simplified.

Furthermore, the boss ratio at the exit side of the final stage moving blade (hub radius/tip radius) is 0.4 or more to 0.65 or less, and therefore the gauging ratio of the final stage stationary blade and the exit angle ratio of the final stage stationary blade of the invention can be determined appropriately.

Moreover, the average degree of reaction of the final stage is 0.3 or more to 0.6 or less, and therefore the average degree of reaction of the final stage can be maintained sufficiently, and there is no particular problem in turbine design.

Furthermore, the curvature from the back side throat to the rear edge of the final stage moving blade (radius of curvature of the back side from the pitch/throat to the rear edge) is 0 or more to 0.15 or less, and therefore the gauging ratio of the final stage stationary blade and the exit angle ratio of the final stage stationary blade of the invention can be determined appropriately.

In the gas turbine of still another aspect of this invention, the pressure is larger in the duct wall drawn parallel or inside, out of the diffuser passage. Accordingly, the pressure at the tip exit side of the final stage blade moving blade opposite to the duct wall is increased, and the pressure ratio at the tip side of the final stage moving blade is smaller. Hence, the Mach number can be suppressed small in the final stage moving blade, and decline of turbine efficiency due to shock wave loss can be securely prevented. Since the pressure ratio at the hub side of the final stage moving blade is unchanged, the degree of reaction at the hub side of the final stage (pressure ratio of moving blade/pressure ratio of stage) remains the same. Therefore, if the degree of reaction at the tip side of the final stage becomes smaller by reducing the pressure ratio at the tip side of the final stage moving blade, there is no particular problem in designing of the turbine.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine operating at a pressure ratio of 20 or more, comprising a final stage of blades that includes a staionary blade and a moving blade, wherein said moving blade is constructed such that the pressure difference at the downstream and upstream sides of said moving blade is 0.15 MPa or less, and a boss ratio at a gas exit side of said moving blade is 0.4 or more to 0.65 or less, wherein the boss ratio is a ratio of a hub radius and a tip radius.

2. A gas turbine operating at a pressure ratio of 20 or more, comprising a final stage of blades that includes a stationary blade and a moving blade, wherein said moving blade is constructed such that the pressure difference at the downstream and upstream sides of said moving blade is 0.15 MPa or less, and a curvature from a back side throat to a rear edge of said moving blade is 0 or more to 0.15 or less, the curvature being equivalent to a radius of curvature of the back side from the pitch/throat to the rear edge.

3. A gas turbine operating at a pressure ratio of 20 or more, comprising a final stage of blades that includes a stationary blade and a moving blade, wherein a gauging ratio of said stationary blade is 0.9 or less, wherein the gauging ratio is a ratio of a tip side gauging and a hub side gauging.

4. The gas turbine according to claim 3, wherein a boss ratio at a gas exit side of said moving blade is 0.4 or more to 0.65 or less, wherein the boss ratio is a ratio of a hub radius and a tip radius.

5. The gas turbine according to claim 3, wherein an average degree of reaction of said final stage of blades is 0.3 or more to 0.6 or less.

6. The gas turbine according to claim 3, wherein a curvature from a back side throat to a rear edge of said moving blade is 0 or more to 0.15 or less, wherein the curvature is equivalent to a radius of curvature of the back side from the pitch/throat to the rear edge.

7. A gas turbine operating at a pressure ratio of 20 or more, comprising a final stage of blades that includes a stationary blade and a moving blade, wherein an exit angle ratio of said stationary blade is 0.85 or more, wherein the exit angle ratio is a ratio of a tip side exit angle and a hub side exit angle.

8. The gas turbine according to claim 7, wherein a boss ratio at a gas exit side of said moving blade is 0.4 or more to 0.65 or less, wherein the boss ratio is a ratio of a hub radius and a tip radius.

9. The gas turbine according to claim 7, wherein an average degree of reaction of said final stage of blades is 0.3 or more to 0.6 or less.

10. The gas turbine according to claim 7, wherein a curvature from a back side throat to a rear edge of said moving blade is 0 or more to 0.15 or less, wherein the curvature is equivalent to a radius of curvature of the back side from the pitch/throat to the rear edge.

11. A gas turbine operating at a pressure ratio of 20 or more, wherein a duct wall in a portion of a specified distance from an end opposing said gas turbine, of a duct forming a diffuser passage communicating with a final exit side of said gas turbine is drawn parallel to or inside of a shaft of the gas turbine.

* * * * *